(12) United States Patent
Kuroda

(10) Patent No.: US 12,420,841 B2
(45) Date of Patent: Sep. 23, 2025

(54) VEHICLE CONTROLLER, VEHICLE CONTROL METHOD, AND VEHICLE CONTROL COMPUTER PROGRAM FOR VEHICLE CONTROL

(71) Applicants: TOYOTA JIDOSHA KABUSHIKI KAISHA, Toyota (JP); DENSO CORPORATION, Kariya (JP)

(72) Inventor: Ryusuke Kuroda, Tokyo-to (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 160 days.

(21) Appl. No.: 18/448,397

(22) Filed: Aug. 11, 2023

(65) Prior Publication Data

US 2024/0067222 A1 Feb. 29, 2024

(30) Foreign Application Priority Data

Aug. 25, 2022 (JP) .................................. 2022-134342

(51) Int. Cl.
*B60W 60/00* (2020.01)
*B60W 40/04* (2006.01)

(52) U.S. Cl.
CPC ......... *B60W 60/0025* (2020.02); *B60W 40/04* (2013.01)

(58) Field of Classification Search
CPC ............. B60W 60/0025; B60W 40/04; B60W 2552/53; B60W 2554/4023; B60W 2554/802; B60W 2554/805; B60W 30/18009; B60W 60/0027; B60W 30/12; B60W 30/18163; B60W 2554/406
See application file for complete search history.

(56) References Cited

U.S. PATENT DOCUMENTS

| | | | |
|---|---|---|---|
| 8,798,841 B1 * | 8/2014 | Nickolaou | B62D 15/0265 701/28 |
| 2019/0071073 A1 | 3/2019 | Yamashita | |
| 2019/0283747 A1 * | 9/2019 | Okabe | B60W 30/10 |
| 2020/0114921 A1 * | 4/2020 | Simmons | G05D 1/0257 |
| 2020/0139974 A1 * | 5/2020 | Schreiber | B60W 30/0956 |
| 2020/0148205 A1 | 5/2020 | Yoshida et al. | |
| 2020/0180635 A1 * | 6/2020 | Hong | B62D 15/024 |
| 2020/0242942 A1 * | 7/2020 | Gilbert | G08G 1/0125 |
| 2022/0135039 A1 * | 5/2022 | Jardine | B60W 30/18163 701/26 |

FOREIGN PATENT DOCUMENTS

| | | |
|---|---|---|
| JP | 2017056765 A | 3/2017 |
| JP | 2019046170 A | 3/2019 |
| WO | 2019043847 A1 | 3/2019 |

* cited by examiner

Primary Examiner — Jelani A Smith
Assistant Examiner — Alyssa Rorie
(74) Attorney, Agent, or Firm — Dickinson Wright, PLLC

(57) ABSTRACT

A vehicle controller includes a processor configured to detect another vehicle traveling behind a host vehicle, based on a sensor signal obtained by a sensor for sensing surroundings of the host vehicle, determine whether the detected other vehicle satisfies an obstructing condition for obstructing view behind the host vehicle, and control the host vehicle to secure the view behind the host vehicle when the obstructing condition is satisfied.

8 Claims, 6 Drawing Sheets

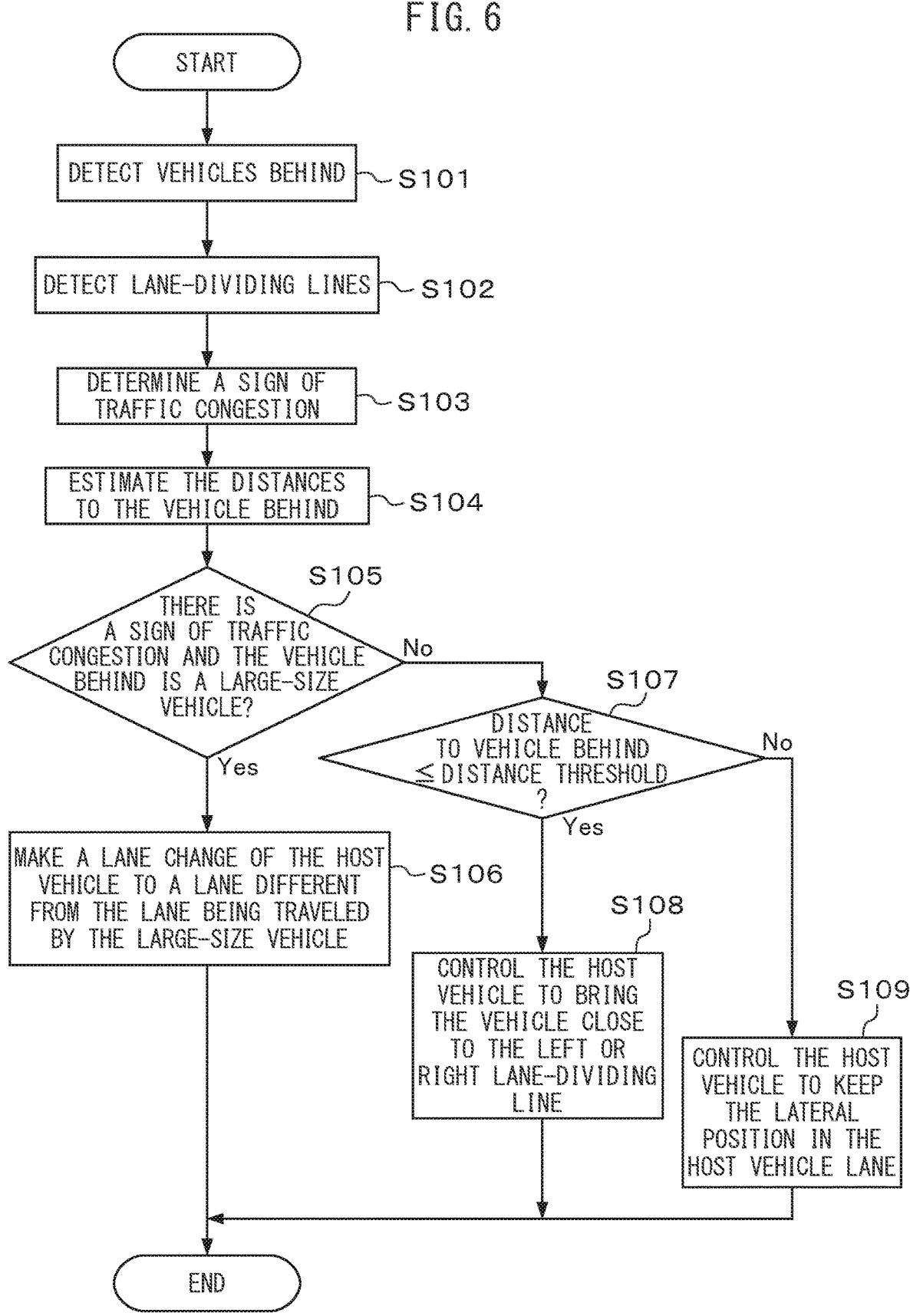

VEHICLE CONTROLLER, VEHICLE CONTROL METHOD, AND VEHICLE CONTROL COMPUTER PROGRAM FOR VEHICLE CONTROL

FIELD

The present invention relates to a vehicle controller, a vehicle control method, and a vehicle control computer program for autonomous driving control of a vehicle.

BACKGROUND

A technique for autonomous driving control of another vehicle based on motion of another vehicle traveling in an area around the vehicle has been researched (see Japanese Unexamined Patent Publication No. 2019-46170).

A vehicle controller described in JP2019-46170 detects a vehicle approaching from behind or beside a host vehicle, based on information on the surroundings of the host vehicle, and controls an avoidance action of the host vehicle, based on the detected vehicle. When the same vehicle has been detected in a predetermined time more than a predetermined number of times or when the same vehicle has been detected for more than a predetermined time, the vehicle controller prevents a new avoidance action.

SUMMARY

Even under autonomous driving control, vehicles have to obey laws and regulations related to travel of vehicles. In particular, when an emergency vehicle is traveling near a vehicle under autonomous driving control, the vehicle should be controlled so as not to prevent travel of the emergency vehicle. However, a large-size vehicle may travel in an area around a vehicle under autonomous driving control, or another vehicle may travel close up to the vehicle under autonomous driving control. In such cases, the view around the vehicle under autonomous driving control, in particular, behind the vehicle may be obstructed, which may prevent the vehicle from monitoring its surroundings sufficiently.

It is an object of the present invention to provide a vehicle controller that can keep a detectable range behind a host vehicle appropriately.

According to an embodiment, a vehicle controller is provided. The vehicle controller includes a processor configured to: detect another vehicle traveling behind a host vehicle, based on a sensor signal obtained by a sensor for sensing surroundings of the host vehicle, determine whether the detected other vehicle satisfies an obstructing condition for obstructing view behind the host vehicle, and control the host vehicle to secure the view behind the host vehicle when the obstructing condition is satisfied.

The processor of the vehicle controller is preferably further configured to determine whether traffic around the host vehicle will be congested in a predetermined period from the current time until a predetermined time ahead. The processor preferably detects a large-size vehicle traveling behind the host vehicle, as the other vehicle, and a lane being traveled by the large-size vehicle, and when it is determined that traffic around the host vehicle will be congested in the predetermined period, the processor preferably controls the host vehicle to move the host vehicle to a lane that is not being traveled by the large-size vehicle.

In this case, the processor preferably identifies a lane through which a destination of the host vehicle is reachable among lanes included in a road being traveled by the host vehicle, based on map information stored in a memory, a planned travel route to the destination, and the current position of the host vehicle. The processor preferably controls the host vehicle so that when the large-size vehicle is not traveling on the identified lane, the host vehicle moves to the identified lane, and when the large-size vehicle is traveling on the identified lane, controls the host vehicle so that the host vehicle moves to a lane that is not being traveled by the large-size vehicle among lanes where a lane change is necessary to reach the destination.

In the case where other vehicles traveling behind the host vehicle are detected on each of lanes included in a road being traveled by the host vehicle and where one of the other vehicles is the large-size vehicle, the processor of the vehicle controller preferably controls the host vehicle to move the host vehicle to a lane on which the number of vehicles between the large-size vehicle and the host vehicle after a lane change among the other vehicles is predicted to be the greatest of the lanes.

Alternatively, the processor of the vehicle controller is preferably further configured to estimate the distance between the host vehicle and a vehicle traveling behind the host vehicle on a host vehicle lane being traveled by the host vehicle among the detected other vehicles traveling behind the host vehicle. The processor of the vehicle controller preferably further detects a lane-dividing line demarcating the host vehicle lane, and controls the position of the host vehicle so that when the estimated distance is not greater than a predetermined distance threshold, a lateral distance from the position of the host vehicle to the lane-dividing line in a direction traversing the host vehicle lane is less than when the estimated distance is greater than the predetermined distance threshold.

In this case, the processor preferably determines whether a road being traveled by the host vehicle has a road shoulder and has two lanes in a travel direction of the host vehicle, by referring to map information and the current position of the host vehicle. When the road does not have a road shoulder but has two lanes in the travel direction of the host vehicle, the processor preferably controls the position of the host vehicle so that the lateral distance to a lane-dividing line on the center side is less than the lateral distance to a lane-dividing line on an edge side of the road.

Alternatively, when the lane being traveled by the host vehicle is adjacent to a merging lane, the processor preferably controls the position of the host vehicle so that the lateral distance to the lane-dividing line on the side of the merging lane is less than the lateral distance to the lane-dividing line opposite the merging lane.

According to another embodiment, a method for vehicle control is provided. The method includes detecting another vehicle traveling behind a host vehicle, based on a sensor signal obtained by a sensor mounted on the host vehicle for sensing surroundings of the host vehicle; determining whether the detected other vehicle satisfies an obstructing condition for obstructing view behind the host vehicle; and controlling the host vehicle to secure the view behind the host vehicle when the obstructing condition is satisfied.

According to still another embodiment, a non-transitory recording medium that stores a computer program for vehicle control is provided. The computer program includes instructions causing a processor mounted on a host vehicle to execute a process including detecting another vehicle traveling behind the host vehicle, based on a sensor signal obtained by a sensor mounted on the host vehicle for sensing surroundings of the host vehicle; determining whether the detected other vehicle satisfies an obstructing condition for obstructing view behind the host vehicle; and controlling the host vehicle to secure the view behind the host vehicle when the obstructing condition is satisfied.

The vehicle controller according to the present disclosure has an advantageous effect of being able to keep a detectable range behind the host vehicle appropriately.

BRIEF DESCRIPTION OF DRAWINGS

FIG. 6 is an operation flowchart of the vehicle control process.

DESCRIPTION OF EMBODIMENTS

A vehicle controller, a method for vehicle control executed by the vehicle controller, and a computer program for vehicle control will now be described with reference to the attached drawings. The vehicle controller detects another vehicle traveling behind a host vehicle, based on a sensor signal obtained by a sensor mounted on the host vehicle for sensing surroundings of the host vehicle. The vehicle controller determines whether the detected vehicle satisfies an obstructing condition for obstructing view behind the host vehicle, and controls the host vehicle to secure the view behind the host vehicle when the obstructing condition is satisfied.

In the present embodiment, the vehicle controller can apply level 2 autonomous driving control defined by the Society of Automotive Engineers (SAE) to the host vehicle. More specifically, the vehicle controller can execute autonomous driving control of the host vehicle on condition that the driver is looking around the host vehicle. The vehicle controller may further be able to apply level 3 autonomous driving control to the host vehicle under a particular condition, e.g., when traffic around the host vehicle is congested. More specifically, when traffic around the host vehicle is congested, the vehicle controller may be able to execute autonomous driving control of the host vehicle even if the driver is not looking around.

Figure 1:
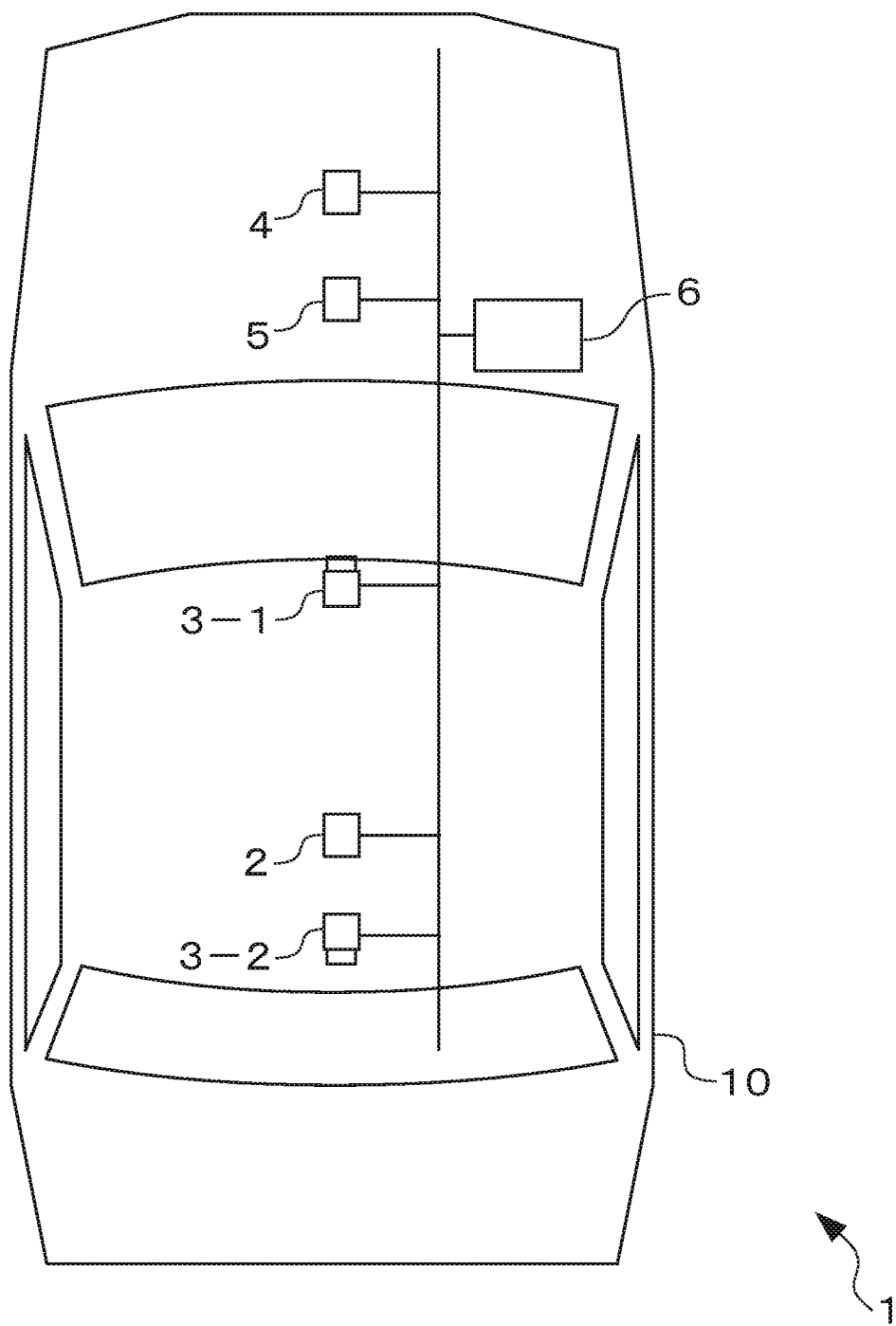
FIG. 1 schematically illustrates the configuration of a vehicle control system equipped with a vehicle controller.
Figure 2:
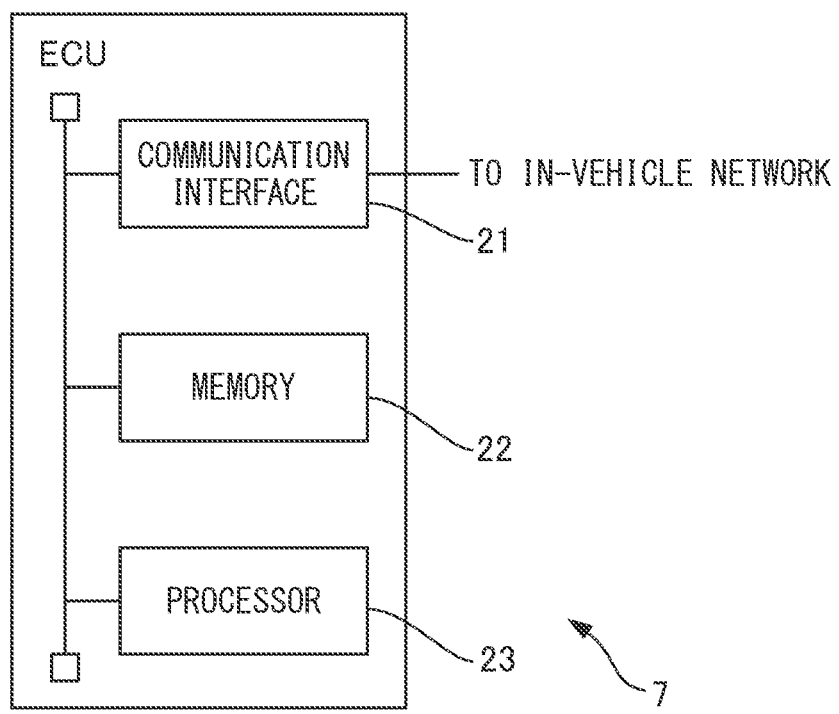
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In the present embodiment, the vehicle control system 1, which is mounted on a vehicle 10 and controls the vehicle 10, includes a GPS receiver 2, two cameras 3-1 and 3-2, a wireless communication terminal 4, a storage device 5, and an electronic control unit (ECU) 6, which is an example of the vehicle controller. The GPS receiver 2, the cameras 3-1 and 3-2, the wireless communication terminal 4, and the storage device 5 are communicably connected to the ECU 6 via an in-vehicle network conforming to a standard such as a controller area network. The vehicle 10 is an example of the host vehicle. The vehicle control system 1 may further include a range sensor (not illustrated) that measures the distances from the vehicle 10 to objects around the vehicle 10, such as LiDAR or radar. Such a distance sensor is an example of the sensor capable of detecting objects around the vehicle 10. The vehicle control system 1 may further include a navigation device (not illustrated) for searching for a planned travel route to a destination.

The GPS receiver 2 receives GPS signals from GPS satellites at predetermined intervals, and determines the position of the vehicle 10, based on the received GPS signals. The GPS receiver 2 outputs positioning information indicating the result of determination of the position of the vehicle 10 based on the GPS signals to the ECU 6 via the in-vehicle network at predetermined intervals. Instead of the GPS receiver 2, the vehicle 10 may include a receiver conforming to another satellite positioning system. In this case, the receiver determines the position of the vehicle 10.

The cameras 3-1 and 3-2 are examples of the sensor capable of detecting objects around the vehicle 10. The cameras 3-1 and 3-2 each includes a two-dimensional detector constructed from an array of optoelectronic transducers, such as CCD or C-MOS, having sensitivity to visible light and a focusing optical system that forms an image of a target region on the two-dimensional detector. The camera 3-1 is mounted, for example, in the interior of the vehicle 10 so as to be oriented, for example, to the front of the vehicle 10. The camera 3-2 is mounted, for example, in the interior of the vehicle 10 so as to be oriented to the rear of the vehicle 10. The cameras 3-1 and 3-2 take pictures of regions in front of and behind the vehicle 10, respectively, every predetermined capturing period (e.g., 1/30 to 1/10 seconds), and generate images representing these regions. Each image obtained by the cameras 3-1 and 3-2 is an example of the sensor signal, and may be a color or grayscale image. The vehicle 10 may include three or more cameras taking pictures in different orientations or having different focal lengths. Every time an image is generated, the cameras 3-1 and 3-2 each output the generated image to the ECU 6 via the in-vehicle network.

The wireless communication terminal 4 communicates with a wireless base station by wireless in conformity with a predetermined standard of mobile communications. The wireless communication terminal 4 receives traffic information indicating the traffic situation of a road being traveled by the vehicle 10 or an area therearound, e.g., information provided by the Vehicle Information and Communication System (VICS [registered trademark]) from another device via the wireless base station. The wireless communication terminal 4 outputs the received traffic information to the ECU 6 via the in-vehicle network. The traffic information includes, for example, information on sections where traffic is congested, the presence or absence of road construction, an accident, or traffic restrictions, and the places and times of day at which road construction is carried out, an accident occurred, or traffic restrictions are imposed. The wireless communication terminal 4 may receive a high-precision map of a predetermined region around the current position of the vehicle 10, which is used for autonomous driving control, from a map server via the wireless base station, and output the received high-precision map to the storage device 5.

The storage device 5, which is an example of the storage unit, includes, for example, a hard disk drive, a nonvolatile semiconductor memory, or an optical medium and an access device therefor. The storage device 5 stores a high-precision map, which is an example of map information. The high-precision map includes, for example, information indicating road markings, such as lane-dividing lines or stop lines, and traffic signs on individual roads within a predetermined region represented in the high-precision map as well as information indicating features around the roads (e.g., noise-blocking walls).

The storage device 5 may further include a processor for executing, for example, a process to update a high-precision map and a process related to a request from the ECU 6 to read out a high-precision map. In this case, for example, every time the vehicle 10 moves a predetermined distance, the storage device 5 transmits a request to obtain a high-precision map, together with the current position of the vehicle 10, to the map server via the wireless communication terminal 4, and receives a high-precision map of a predetermined region around the current position of the vehicle 10 from the map server via the wireless communication terminal 4. Upon receiving a request from the ECU 6 to read out a high-precision map, the storage device 5 cuts out that portion of a high-precision map stored therein which includes the current position of the vehicle 10 and which represents a region smaller than the predetermined region, and outputs the cutout portion to the ECU 6 via the in-vehicle network.

The ECU 6 detects other vehicles traveling around the vehicle 10, and controls travel of the vehicle 10, based on the detected vehicles.

As illustrated in FIG. 2, the ECU 6 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 6 to the in-vehicle network. Every time positioning information is received from the GPS receiver 2, the communication interface 21 passes the positioning information to the processor 23. Every time an image is received from the camera 3-1 or 3-2, the communication interface 21 passes the received image to the processor 23. Further, the communication interface 21 passes a high-precision map read from the storage device 5 to the processor 23.

The memory 22, which is another example of the storage unit, includes, for example, volatile and nonvolatile semiconductor memories, and stores various types of data used in a vehicle control process executed by the processor 23 of the ECU 6. For example, the memory 22 stores a high-precision map; parameters indicating the focal lengths, the angles of view, the orientations, and the mounted positions of the cameras 3-1 and 3-2; and a set of parameters for specifying a classifier for object detection used for detecting traveling vehicles around the vehicle 10. In addition, the memory 22 temporarily stores sensor signals, such as images of the surroundings of the vehicle 10 generated by the camera 3-1 or 3-2; the result of determination of the position of the host vehicle by the GPS receiver 2; and various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10.

Figure 3:
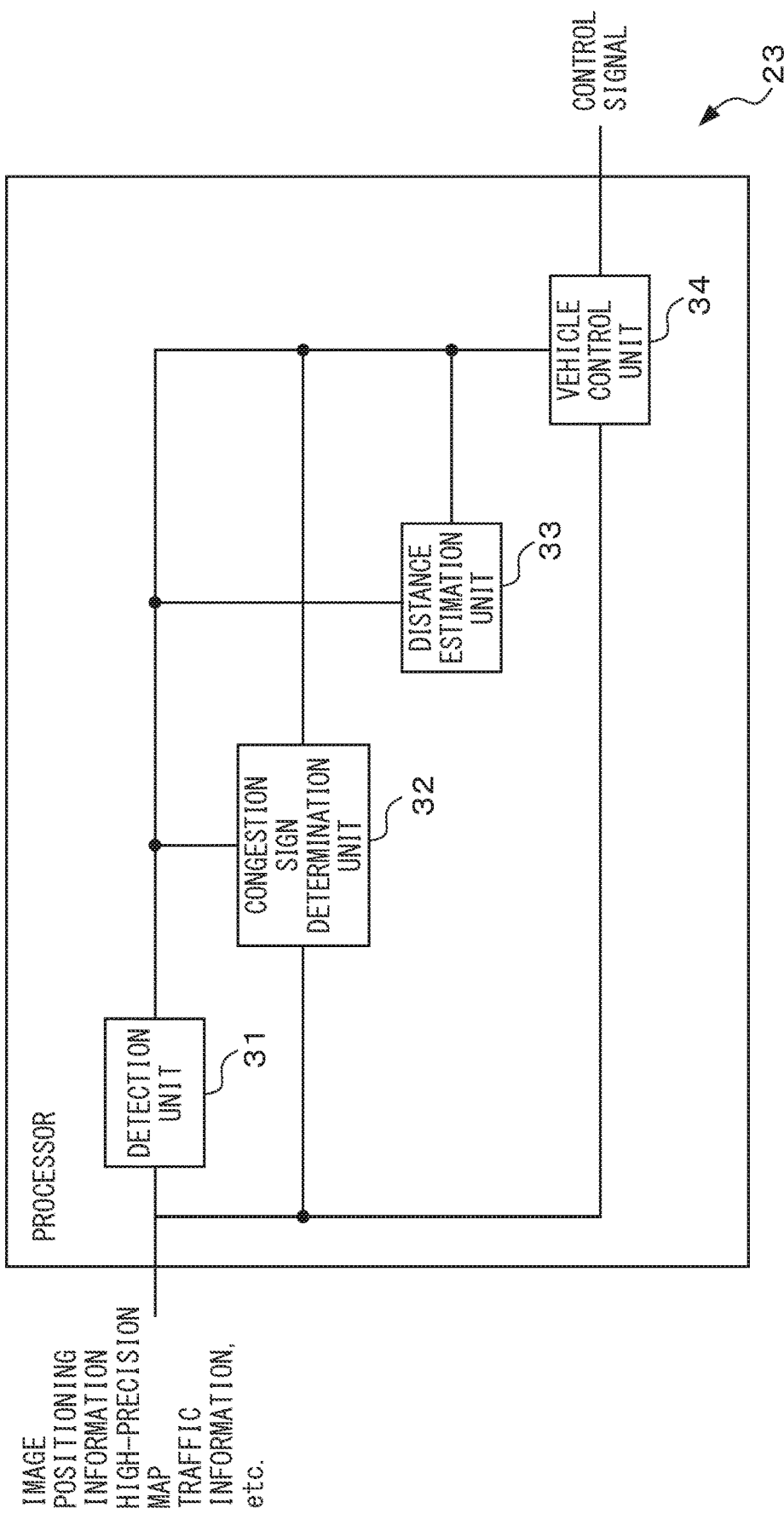
FIG. 3 is a functional block diagram of a processor of the electronic control unit, related to a vehicle control process.

FIG. 3 is a functional block diagram of the processor 23, related to the vehicle control process. The processor 23 includes a detection unit 31, a congestion sign determination unit 32, a distance estimation unit 33, and a vehicle control unit 34. These units included in the processor 23 are functional modules, for example, implemented by a computer program executed by the processor 23, or may be dedicated operating circuits provided in the processor 23.

Every time the ECU 6 obtains an image from the camera 3-1 or 3-2, the detection unit 31 detects vehicles around the vehicle 10, based on the obtained image.

For example, every time the ECU 6 obtains an image from the camera 3-1 or 3-2, the detection unit 31 inputs the image into a classifier to detect traveling vehicles around the vehicle 10. As such a classifier, the detection unit 31 can use a deep neural network (DNN) having architecture of a convolutional neural network (CNN) type, such as Single Shot MultiBox Detector (SSD) or Faster R-CNN. Such a classifier is trained in advance to detect objects to be detected around the vehicle 10 (e.g., ordinary passenger cars, large-size vehicles, motorcycles, pedestrians, road markings such as lane-dividing lines, and signposts) from an image. The classifier outputs information for identifying object regions including objects detected in an inputted image and information indicating the types of the detected objects (e.g., ordinary passenger cars, large-size vehicles, motorcycles, pedestrians, road markings, and traffic signs). In the present embodiment, since the camera 3-2 is provided to take pictures of a region behind the vehicle 10, a vehicle represented in an image obtained from the camera 3-2 (hereafter a "rear image") is a vehicle traveling behind the vehicle 10. Thus the detection unit 31 determines a vehicle detected by inputting a rear image into the classifier, as a vehicle behind. In particular, the detection unit 31 detects a vehicle classified as a large-size vehicle by the classifier into which a rear image is inputted, as a large-size vehicle traveling behind the vehicle 10.

Further, the detection unit 31 detects lane-dividing lines and a lane being traveled by the vehicle 10 (hereafter a "host vehicle lane"). In the present embodiment, lane-dividing lines as well as other vehicles are detected by inputting an image obtained from the camera 3-1 or 3-2 into the classifier. Since the camera 3-2 is oriented to the rear of the vehicle 10, the detection unit 31 can determine a lane corresponding to a region sandwiched between two lane-dividing lines closest to the horizontal center of a rear image on the respective sides with respect to the horizontal center, as the host vehicle lane. The detection unit 31 can further determine the two lane-dividing lines as those demarcating the host vehicle lane.

For each detected vehicle behind, the detection unit 31 further identifies a lane being traveled by the vehicle behind. For example, the detection unit 31 compares the position of the detected vehicle behind in the rear image with the positions of individual lane-dividing lines detected from the rear image to identify the lane being traveled by the vehicle behind. More specifically, the detection unit 31 determines a lane corresponding to a region in the rear image sandwiched between two lane-dividing lines on the respective sides of the bottom of the object region representing the vehicle behind, as the lane being traveled by the vehicle behind. As described above, the detection unit 31 can determine a lane corresponding to a region sandwiched between two lane-dividing lines closest to the horizontal center of a rear image on the respective sides with respect to the horizontal center, as the host vehicle lane. Thus the detection unit 31 can identify the position of the lane being traveled by the vehicle behind relative to the host vehicle lane, by counting the number of lane-dividing lines between the region corresponding to the lane being traveled by the vehicle behind and the region corresponding to the host vehicle lane in the rear image.

In the case where the vehicle 10 is equipped with a range sensor, the detection unit 31 can estimate the direction from the vehicle 10 corresponding to the centroid of an object region representing the vehicle behind in a rear image, as the direction from the vehicle 10 to the vehicle behind. Further, the detection unit 31 can estimate the distance measured by the range sensor in the direction, as the distance from the vehicle 10 to the vehicle behind. From the estimated distance and direction to the vehicle behind, the detection unit 31 determines the distance from the vehicle 10 to the vehicle behind in a direction perpendicular to the travel direction of the vehicle 10 (a distance in a direction perpendicular to the travel direction of the vehicle 10 will be referred to as a "lateral distance" below). The detection unit 31 can identify the position of the lane being traveled by the vehicle behind relative to the host vehicle lane, by dividing the lateral distance by the lane width. The detection unit 31 refers to map information to identify the lane width at the position of the host vehicle measured by the GPS receiver 2.

The detection unit 31 notifies the congestion sign determination unit 32, the distance estimation unit 33, and the vehicle control unit 34 of information indicating the detected vehicles behind and the positions of the lanes being traveled by the detected vehicles behind (in particular, a large-size vehicle).

The congestion sign determination unit 32 determines whether traffic around the vehicle 10 will be congested in a predetermined period from the current time until a predetermined time ahead. In the following, the prediction that traffic around the vehicle 10 will be congested will be referred to as "there is a sign of traffic congestion."

For example, the congestion sign determination unit 32 determines whether there is a sign of traffic congestion, based on motion of another vehicle traveling in an area around the vehicle 10 detected by the detection unit 31.

To achieve this, the congestion sign determination unit 32 executes a predetermined tracking process, such as a tracking process using optical flow, on other vehicles detected from each of time-series images obtained from the camera 3-1 or 3-2 to track the other vehicles. The congestion sign determination unit 32 executes viewpoint transformation on each image, using parameters of the camera 3-1 or 3-2, such as the focal length, the orientation, and the height of the mounted position, to transform the image into an aerial image. In this way, the congestion sign determination unit 32 calculates the positions of the tracked vehicles relative to the vehicle 10 at the time of acquisition of each image. To this end, the congestion sign determination unit 32 may use the distance to the tracked vehicle measured by the range sensor to calculate the relative position of the tracked vehicle, as described in relation to the detection unit 31. In addition, the bottom of an object region representing the tracked vehicle is assumed to correspond to the position where the tracked vehicle touches the road surface. Thus the congestion sign determination unit 32 may estimate the distance from the vehicle 10 to the tracked vehicle at the time of acquisition of each image, based on the direction from the camera 3-1 or 3-2 corresponding to the bottom of the object region representing the tracked vehicle in each image and the height of the mounted position. The congestion sign determination unit 32 may use the estimated distance to calculate the position of the tracked vehicle relative to the vehicle 10.

The congestion sign determination unit 32 selects a vehicle traveling ahead of the vehicle 10 among the vehicles being tracked. When there are multiple vehicles ahead, the congestion sign determination unit 32 may select the vehicle closest to the vehicle 10 of the vehicles ahead. The congestion sign determination unit 32 applies a prediction filter, such as a Kalman filter, to time-varying changes in the position of the selected vehicle ahead relative to the vehicle 10 in the period during which the selected vehicle is tracked. In addition, the congestion sign determination unit 32 applies the prediction filter to time-varying changes in measurement values of the speed of the vehicle 10 in the most recent certain period to predict changes in the speed of the vehicle 10 in a predetermined future period. For example, the congestion sign determination unit 32 obtains the measurement values of the speed of the vehicle 10 from a vehicle speed sensor (not illustrated) mounted on the vehicle 10 via the communication interface 21 to determine the time-varying changes in the vehicle speed in the most recent certain period to which the prediction filter is to be applied. In this way, the congestion sign determination unit 32 predicts changes in the speed of the vehicle ahead relative to the vehicle 10 and changes in the distance between the vehicle ahead and the vehicle 10 in the predetermined future period from the current time until a predetermined time ahead.

The congestion sign determination unit 32 determines whether there is a first period during which the absolute value of the speed of the vehicle ahead relative to the vehicle 10 is predicted to be not greater than a predetermined relative-speed threshold and the distance between the vehicle 10 and the vehicle ahead is predicted to be within a predetermined distance range, in the predetermined period from the current time until a predetermined time ahead. When there is such a first period, the congestion sign determination unit 32 determines that there is a sign of traffic congestion, and predicts the start time of the first period to be timing at which the vehicle 10 will be caught in traffic congestion. The relative-speed threshold is set, for example, at 1 m/s. The predetermined distance range is set, for example, between 3 m and 25 m. The first period is set, for example, between 3 and 5 seconds.

Alternatively, for every tracked vehicle, the congestion sign determination unit 32 may predict changes in the speed of the tracked vehicle relative to the vehicle 10 and changes in the distance between the tracked vehicle and the vehicle 10 in the predetermined period from the current time until a predetermined time ahead. The congestion sign determination unit 32 may determine that there is a sign of traffic congestion, when there is a first period during which the speed of every tracked vehicle relative to the vehicle 10 is predicted to be not greater than a predetermined relative-speed threshold (e.g., 3 m/s) in the predetermined period. In this case also, the congestion sign determination unit 32 predicts the start time of the first period to be timing at which the vehicle 10 will be caught in traffic congestion.

Alternatively, the congestion sign determination unit 32 may determine whether there is a sign of traffic congestion, based on prediction of time-varying changes in the speed of the vehicle 10 in the predetermined future period. For example, the congestion sign determination unit 32 determines that there is a sign of traffic congestion, when the speed of the vehicle 10 is predicted to be not greater than a first speed threshold (e.g., 20 km/h) for a second period (e.g., 5 seconds) in the predetermined future period. Alternatively, the congestion sign determination unit 32 may determine that there is a sign of traffic congestion, when changes in the speed of the vehicle 10 are predicted to be within a predetermined speed range (e.g., 1 m/s) for the second period in the predetermined period. In this case also, the congestion sign determination unit 32 predicts the start time of the second period to be timing at which the vehicle 10 will be caught in traffic congestion.

Alternatively, the congestion sign determination unit 32 may determine that there is a sign of traffic congestion, when traffic information received via the wireless communication terminal 4 indicates that traffic within a predetermined distance is congested in the travel direction of the vehicle 10 on a road being traveled by the vehicle 10. In this case, the congestion sign determination unit 32 identifies the road being traveled by the vehicle 10, by referring to the current position of the vehicle 10 and a high-precision map. Further, the congestion sign determination unit 32 predicts an expected time at which the vehicle 10 will reach the congested section indicated by the traffic information for the case where the vehicle 10 will keep traveling at the average speed of the vehicle 10 in the most recent certain period to be timing at which the vehicle 10 will be caught in traffic congestion.

Alternatively, the congestion sign determination unit 32 may determine that there is a sign of traffic congestion, only when it is determined so by two or more of the above-described techniques for determination of congestion. In this case, the congestion sign determination unit 32 determines the earliest of two or more predicted timings, corresponding to signs of traffic congestion, at which the vehicle 10 will be caught in traffic congestion, as the timing at which the vehicle 10 will be caught in traffic congestion.

The congestion sign determination unit 32 notifies the vehicle control unit 34 of the result of determination whether there is a sign of traffic congestion.

The distance estimation unit 33 estimates the distances between the vehicle 10 and the vehicles traveling behind the vehicle 10 detected by the detection unit 31. The distance estimation unit 33 can estimate the distance between each vehicle behind and the vehicle 10 in the same manner as described in relation to the detection unit 31 or the congestion sign determination unit 32. More specifically, the distance estimation unit 33 estimates the distance between the vehicle 10 and a vehicle behind, based on the direction from the camera 3-1 or 3-2 corresponding to the bottom position of the object region including the vehicle behind in an image and the height of the mounted position of the camera. Alternatively, the distance estimation unit 33 estimates the distance between the vehicle 10 and a vehicle behind, based on the distance measured by the range sensor in the direction from the vehicle 10 to the vehicle behind.

The distance estimation unit 33 notifies the vehicle control unit 34 of the estimate of the distance for each vehicle behind.

The vehicle control unit 34 determines whether each detected vehicle behind satisfies an obstructing condition for obstructing view behind the vehicle 10, based on the estimate of the distance for the vehicle behind or the presence or absence of a sign of traffic congestion. When the obstructing condition is satisfied, the vehicle control unit 34 controls the vehicle 10 to secure the view behind the vehicle 10.

For example, the vehicle control unit 34 determines that the obstructing condition is satisfied, in the case where it is determined by the congestion sign determination unit 32 that there is a sign of traffic congestion in a predetermined period from the current time until a predetermined time ahead and where at least one of the vehicles behind is a large-size vehicle. In this case, the vehicle control unit 34 controls the vehicle 10 to move the vehicle 10 to a lane different from the lane being traveled by the large-size vehicle, which is a vehicle behind. In particular, the vehicle control unit 34 preferably controls the vehicle 10 to finish a lane change before the predicted timing at which traffic around the vehicle 10 will be congested. When the lane of the large-size vehicle traveling behind the vehicle 10 differs from the host vehicle lane, the vehicle control unit 34 controls the vehicle 10 so that the vehicle 10 continues traveling on the host vehicle lane. By moving the vehicle 10 to a lane that is not being traveled by the large-size vehicle before the vehicle 10 is caught in traffic congestion, the vehicle control unit 34 can prevent a decrease in the detectable range behind the vehicle 10 and facilitate detection of an approaching emergency vehicle or motorcycle. This enables increasing chances of application of autonomous driving control in traffic congestion.

To identify a destination lane, the vehicle control unit 34 refers to a high-precision map, a planned travel route to a destination of the vehicle 10 received from a navigation device, and the current position of the vehicle measured by the GPS receiver 2. The vehicle control unit 34 then identifies a lane through which the destination is reachable among lanes of a road being traveled by the vehicle 10. For example, when the vehicle 10 has to turn right at the next intersection to go to the destination, the lane from which vehicles can turn right at the next intersection is the lane through which the destination is reachable. Alternatively, in the case where there is a route diverging from a left lane at a predetermined distance away from the current position of the vehicle 10 and where the vehicle 10 has to enter the diverging route to go to the destination, the left lane is the lane through which the destination is reachable. When no large-size vehicle is traveling behind the vehicle 10 on the identified lane, the vehicle control unit 34 moves the vehicle 10 to the identified lane. Only when a large-size vehicle is traveling behind the vehicle 10 on the identified lane, the vehicle control unit 34 moves the vehicle 10 to a lane that is not being traveled by the large-size vehicle behind the vehicle 10 among lanes where a lane change is necessary to reach the destination.

In some cases, the road being traveled by the vehicle 10 includes three or more lanes, and no large-size vehicle is detected behind the vehicle 10 on two or more of these lanes. In such cases, the vehicle control unit 34 preferably causes the vehicle 10 to make a lane change to a passing lane among the lanes where no large-size vehicle is detected. In particular, when the road being traveled by the vehicle 10 has a climbing lane, a large-size vehicle is likely to enter the climbing lane. Thus the vehicle control unit 34 preferably causes the vehicle 10 to make a lane change to a lane other than the climbing lane even if no large-size vehicle is detected behind the vehicle 10 on the climbing lane. By selecting the destination lane in this way, the vehicle control unit 34 can reduce the possibility of approach of a large-size vehicle behind the vehicle 10 in traffic congestion around the vehicle 10, increasing the possibility of securing the view behind the vehicle 10.

In the case where vehicles traveling behind are detected on each of lanes of a road being traveled by the vehicle 10 and where one of the vehicles is a large-size vehicle, the vehicle control unit 34 may predict trajectories of the vehicle 10 and the vehicles behind for the case where a lane change is made. From the result of prediction, the vehicle control unit 34 may predict the number of vehicles between the vehicle 10 and the large-size vehicle. The detectable range behind the vehicle is longer on a lane where the number of vehicles between the vehicle 10 and the large-size vehicle is greater. Thus the vehicle control unit 34 preferably determines a lane on which the number of vehicles between the vehicle 10 and the large-size vehicle is predicted to be the greatest of the lanes, as a destination lane.

In this case, the vehicle control unit 34 applies a prediction filter, such as a Kalman filter, to the result of tracking of other vehicles traveling around the vehicle 10 obtained by the congestion sign determination unit 32, thereby predicting trajectories of the other vehicles in a period from the current time until a predetermined time ahead. For each candidate lane that is the destination of a lane change, the vehicle control unit 34 sets a provisional planned trajectory so that the vehicle 10 will move from the host vehicle lane to the candidate lane and be separated from the predicted trajectories of the other vehicles by more than a predetermined distance. Based on the predicted trajectories of the other vehicles, the vehicle control unit 34 predicts the number of vehicles between the vehicle 10 and the large-size vehicle for the case where the vehicle 10 moves along the provisional planned trajectory.

In addition, the vehicle control unit 34 determines that the obstructing condition is satisfied, when the distance from the vehicle 10 to a vehicle traveling behind on the host vehicle lane is not greater than a predetermined distance threshold. In this case, the vehicle control unit 34 controls the vehicle 10 to bring the vehicle 10 close to the left or right lane-dividing line demarcating the host vehicle lane. More specifically, the vehicle control unit 34 preferably controls the vehicle 10 so that a lateral distance from the position of the vehicle 10 to a lane-dividing line demarcating the host vehicle lane in a direction traversing the host vehicle lane is less than when the estimated distance to the vehicle behind is greater than the predetermined distance threshold. In this way, the vehicle control unit 34 causes the vehicle 10 to travel close to a lane-dividing line when there is a vehicle behind, to prevent a decrease in the detectable range behind the vehicle 10, allowing for facilitating detection of an approaching emergency vehicle or motorcycle.

In this case, the vehicle control unit 34 may determine whether a road being traveled by the vehicle 10 has a road shoulder and has two lanes in the travel direction of the vehicle 10, by referring to information on a high-precision map and the current position of the vehicle 10 measured by the GPS receiver 2. When the road being traveled by the vehicle 10 does not have a road shoulder but has two lanes in the travel direction of the vehicle 10, the vehicle control unit 34 controls the position of the vehicle 10 so that the lateral distance to a lane-dividing line on the center side is less than the lateral distance to a lane-dividing line on an edge side of the road. This enables the vehicle control unit 34 to facilitate detection of a vehicle approaching the vehicle 10 from behind the vehicle 10.

When the vehicle 10 is traveling on a curved road, the vehicle 10 can secure the view behind without approaching a lane-dividing line much. Thus, when the vehicle 10 is traveling on a curved road, the vehicle control unit 34 may make the lateral distance from a lane-dividing line to the vehicle 10 greater than when the vehicle 10 is traveling on a straight road. This enables the vehicle control unit 34 to secure the view behind the vehicle 10 and to keep a certain distance between the vehicle 10 and another vehicle traveling on a lane adjacent to the host vehicle lane when the vehicle 10 is traveling on a curved road.

The vehicle control unit 34 may decrease the lateral distance to a lane-dividing line as the distance between the vehicle 10 and a vehicle traveling behind on the host vehicle lane decreases. Alternatively, when a vehicle traveling behind on the host vehicle lane is near the left or right lane-dividing line rather than at the center of the host vehicle lane, the vehicle control unit 34 may control the vehicle 10 to approach the lane-dividing line opposite the one on the side of the vehicle behind. This enables the vehicle control unit 34 to secure the view behind the vehicle 10 more easily.

When the speed of another vehicle is predicted to decrease from the current speed of the other vehicle by a predetermined time ahead, the distance between the vehicle 10 and a vehicle behind is supposed to decrease. In such a case, the vehicle control unit 34 may control the position of the vehicle 10 to decrease the lateral distance from the vehicle 10 to a lane-dividing line before the decrease in the distance between the vehicle behind and the vehicle 10. The vehicle control unit 34 determines whether the speed of another vehicle will decrease, based on a predicted trajectory of the other vehicle as described above. Alternatively, the vehicle control unit 34 may search for a location at which the legally permitted speed is reduced in a section from the current position of the vehicle 10 to a predetermined distance away in the travel direction of the vehicle 10, by referring to the current position of the vehicle 10 and a high-precision map. When there is such a location, the vehicle control unit 34 may determine that the speed of a vehicle will decrease.

When the vehicle 10 is traveling on a lane adjacent to a merging lane, an undetected vehicle may approach from the merging lane. To facilitate detection of such an approaching vehicle, the vehicle control unit 34 may control the position of the vehicle 10 so that the lateral distance to the lane-dividing line on the side of the merging lane is less than the lateral distance to the lane-dividing line opposite the merging lane. The vehicle control unit 34 determines whether the host vehicle lane is adjacent to a merging lane, by referring to the position of the host vehicle and a high-precision map.

Upon determining to make a lane change or to change the lateral position in the host vehicle lane as described above, the vehicle control unit 34 generates a planned trajectory of the vehicle 10 according to the result of determination. For example, in the case where a large-size vehicle traveling behind the vehicle 10 is detected and where there is a sign of traffic congestion, the vehicle control unit 34 sets a planned trajectory so that the vehicle 10 will make a lane change to a lane different from the lane being traveled by the large-size vehicle before the predicted timing at which the vehicle 10 will be caught in traffic congestion. Alternatively, when the distance from the vehicle 10 to a vehicle traveling behind on the host vehicle lane is not greater than the predetermined distance threshold, the vehicle control unit 34 sets a planned trajectory to bring the vehicle 10 close to the left or right lane-dividing line demarcating the host vehicle lane. The vehicle control unit 34 preferably sets a planned trajectory, by referring to predicted trajectories of other vehicles traveling around the vehicle 10, so as to keep at least a predetermined distance from the other vehicles. The planned trajectory is represented, for example, as a set of target positions of the vehicle 10 at respective times during travel of the vehicle 10 through a predetermined section.

Upon setting a planned trajectory, the vehicle control unit 34 controls components of the vehicle 10 so that the vehicle 10 travels along the planned trajectory. For example, the vehicle control unit 34 determines a target acceleration of the vehicle 10 according to the planned trajectory and the current speed of the vehicle 10 measured by a vehicle speed sensor (not illustrated), and sets the degree of accelerator opening or the amount of braking so that the acceleration of the vehicle 10 is equal to the target acceleration. The vehicle control unit 34 then determines the amount of fuel injection according to the set degree of accelerator opening, and outputs a control signal depending on the amount of fuel injection to a fuel injector of an engine of the vehicle 10. Alternatively, the vehicle control unit 34 controls a power supply of a motor for driving the vehicle 10 so that electric power depending on the set degree of accelerator opening is supplied to the motor. Alternatively, the vehicle control unit 34 outputs a control signal depending on the set amount of braking to the brake of the vehicle 10. In addition, the vehicle control unit 34 determines the steering angle of the vehicle 10 for the vehicle 10 to travel along the planned trajectory, based on the planned trajectory and the current position of the vehicle 10, and outputs a control signal depending on the steering angle to an actuator (not illustrated) that controls the steering wheel of the vehicle 10. The vehicle control unit 34 can estimate the position and direction of the vehicle 10 at the time of generation of the latest image by determining the position and direction of the vehicle 10 for the case where features detected from the image and projected onto a high-precision map match corresponding features on the high-precision map the best. The vehicle control unit 34 can estimate the current position of the vehicle 10 by correcting the position and direction of the vehicle 10 at the time of generation of the image, using, for example, the acceleration and yaw rate of the vehicle 10 from the time of generation of the image to the current time.

Figure 4:
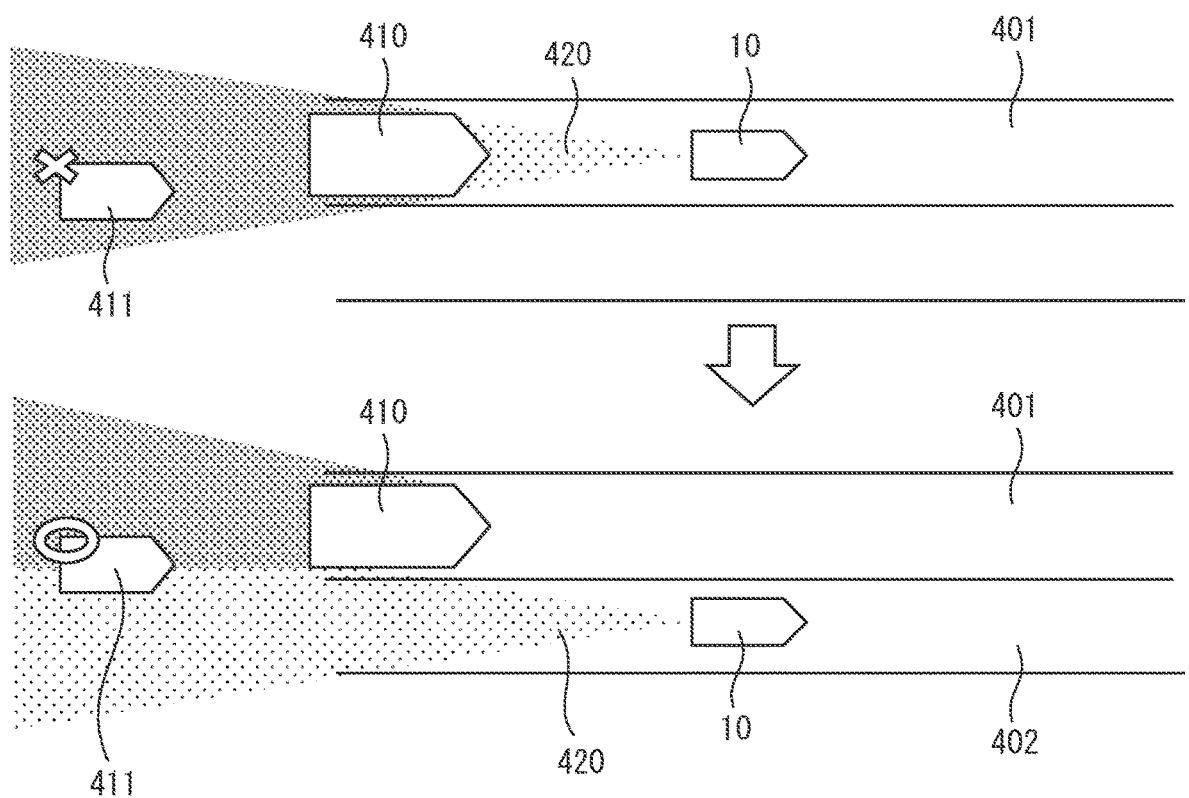
FIG. 4 illustrates an example of control of a host vehicle for the case where a large-size vehicle traveling behind the host vehicle is detected.

FIG. 4 illustrates an example of control of the vehicle 10 for the case where a large-size vehicle traveling behind the vehicle 10 is detected. In this example, a large-size vehicle 410 is traveling behind the vehicle 10 on a lane 401 being traveled by the vehicle 10, as illustrated on the upper side of FIG. 4. Thus the view 420 behind the vehicle 10 is obstructed by the large-size vehicle 410, and a vehicle 411 traveling further behind the large-size vehicle 410 cannot be seen from the vehicle 10. The view 420 behind the vehicle 10 can be secured by the vehicle 10 making a lane change to a lane 402 adjacent to the lane 401 before the vehicle 10 is caught in traffic congestion, as illustrated on the lower side of FIG. 4. This enables the vehicle 411 traveling further behind the large-size vehicle 410 to be seen from the vehicle 10.

Figure 5:
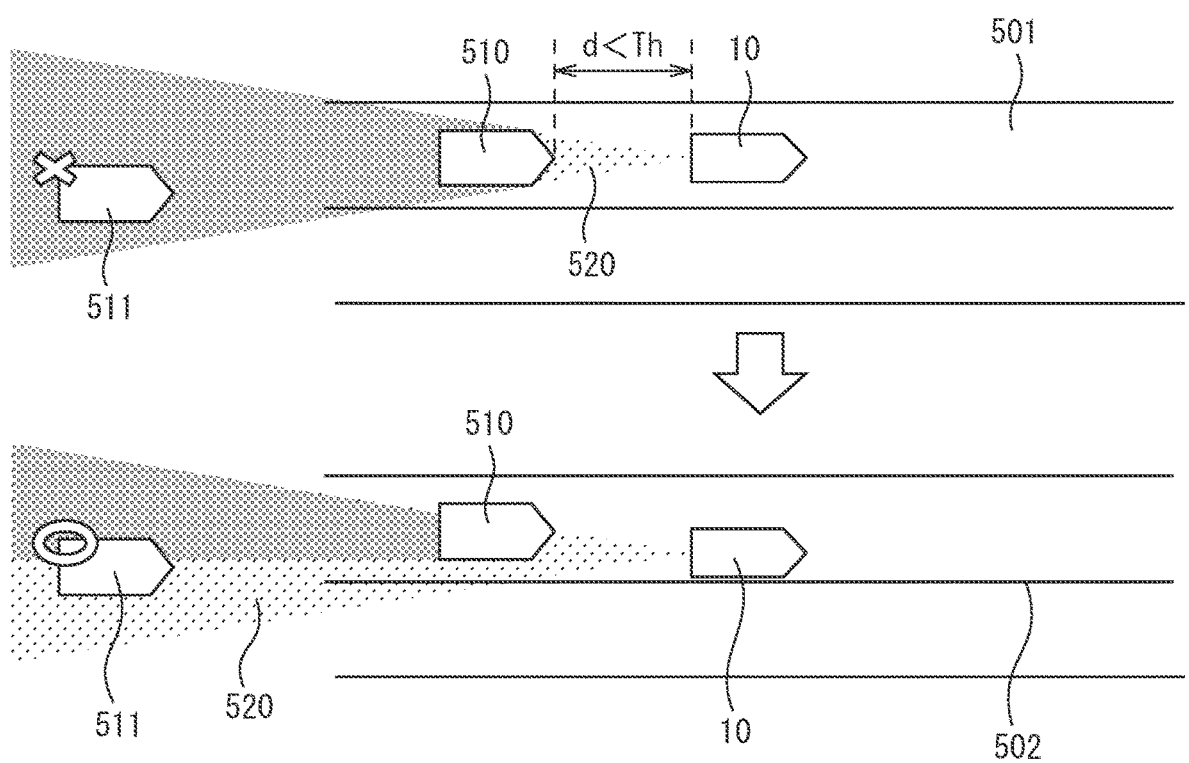
FIG. 5 illustrates an example of control of the host vehicle for the case where the distance between the host vehicle and a vehicle traveling behind the host vehicle is short.

FIG. 5 illustrates an example of control of the vehicle 10 for the case where the distance between the vehicle 10 and a vehicle traveling behind the vehicle 10 is short. In this example, a vehicle 510 is traveling behind the vehicle 10 on a lane 501 being traveled by the vehicle 10, as illustrated on the upper side of FIG. 5. The distance d between the vehicle 10 and the vehicle behind 510 is less than a distance threshold Th. Thus the view 520 behind the vehicle 10 is obstructed by the vehicle behind 510, and a vehicle 511 traveling further behind the vehicle behind 510 cannot be seen from the vehicle 10. The view 520 behind the vehicle 10 can be secured by bringing the vehicle 10 close to a lane-dividing line 502, as illustrated on the lower side of FIG. 5. This enables the vehicle 511 traveling further behind the vehicle 510 to be seen from the vehicle 10.

FIG. 6 is an operation flowchart of the vehicle control process executed by the processor 23. The processor 23 executes the vehicle control process at predetermined intervals in accordance with the operation flowchart described below.

The detection unit 31 of the processor 23 detects vehicles traveling behind the vehicle 10 (step S101). The detection unit 31 further detects lane-dividing lines (step S102).

The congestion sign determination unit 32 of the processor 23 determines whether there is a sign that traffic around the vehicle 10 will be congested in a predetermined period from the current time until a predetermined time ahead (step S103). The distance estimation unit 33 of the processor 23 estimates the distances between the vehicle 10 and the vehicles behind (step S104).

The vehicle control unit 34 of the processor 23 determines whether there is a sign of traffic congestion and at least one of the vehicles behind is a large-size vehicle (step S105). In the case where there is a sign of traffic congestion and where at least one of the vehicles behind is a large-size vehicle (Yes in step S105), the vehicle control unit 34 determines that the obstructing condition is satisfied. The vehicle control unit 34 then controls the vehicle 10 to move the vehicle 10 to a lane different from the lane being traveled by the large-size vehicle, which is a vehicle behind (step S106).

In the case where none of the vehicles behind is a large-size vehicle or where there is not a sign of traffic congestion (No in step S105), the vehicle control unit 34 determines whether the distance from the vehicle 10 to a vehicle traveling behind on the host vehicle lane is not greater than a predetermined distance threshold (step S107). When the distance from the vehicle 10 to a vehicle traveling behind on the host vehicle lane is not greater than a predetermined distance threshold (Yes in step S107), the vehicle control unit 34 determines that the obstructing condition is satisfied. The vehicle control unit 34 then controls the vehicle 10 to bring the vehicle 10 close to the left or right lane-dividing line demarcating the host vehicle lane (step S108).

When the distance from the vehicle 10 to a vehicle traveling behind on the host vehicle lane is greater than a predetermined distance threshold in step S107 (No in step S107), the vehicle control unit 34 determines that the obstructing condition is not satisfied. The vehicle control unit 34 then controls the vehicle 10 to keep the lateral position of the vehicle 10 in the host vehicle lane (step S109).

After step S106, S108, or S109, the processor 23 terminates the vehicle control process. When both the obstructing conditions in step S105 and S107 are satisfied, the vehicle control unit 34 may execute processing in step S106. More specifically, the vehicle control unit 34 controls the vehicle 10 to move the vehicle 10 to a lane different from the lane being traveled by the large-size vehicle, which is a vehicle behind. When the obstructing condition in step S107 is satisfied after the lane change of the vehicle 10, the vehicle control unit 34 may further execute processing in step S108.

As has been described above, the vehicle controller detects a vehicle traveling behind a host vehicle, based on a sensor signal obtained by a sensor mounted on the host vehicle for sensing surroundings of the host vehicle. The vehicle controller determines whether the detected vehicle satisfies an obstructing condition for obstructing view behind the host vehicle, and controls the host vehicle to secure the view behind the host vehicle when the obstructing condition is satisfied. Thus the vehicle controller can keep a detectable range behind the host vehicle appropriately.

According to a modified example, the detection unit 31 may detect vehicles behind, based on a sensor signal obtained by a sensor, other than the cameras 3-1 and 3-2, for sensing objects around the vehicle 10, e.g., a ranging signal of a range sensor. In this case, the classifier used by the detection unit 31 is trained in advance to detect a vehicle from a sensor signal obtained by the sensor for each of regions set within the detection range of the sensor. In this case also, the classifier may be configured by a DNN as in the embodiment or modified examples. Alternatively, the classifier may be one based on a machine learning technique different from a DNN, such as a support vector machine.

The computer program for achieving the functions of the processor 23 of the ECU 6 according to the embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A vehicle controller comprising:
   a processor configured to:
   detect another vehicle traveling behind a host vehicle, based on a sensor signal obtained by a sensor for sensing surroundings of the host vehicle,
   determine whether the detected other vehicle satisfies an obstructing condition for obstructing view behind the host vehicle,
   control the host vehicle to secure the view behind the host vehicle when the obstructing condition is satisfied;
   determine whether traffic around the host vehicle will be congested in a predetermined period from a current time until a predetermined time ahead based on tracking other vehicles in a time series of images received from the sensor, and wherein
   the processor detects a large-size vehicle traveling behind the host vehicle, as the other vehicle, and a lane being traveled by the large-size vehicle, and
   when it is determined that traffic around the host vehicle will be congested in the predetermined period, the processor controls the host vehicle to move the host vehicle to a lane that is not being traveled by the large-size vehicle.

2. The vehicle controller according to claim 1, wherein the processor identifies a lane through which a destination of the host vehicle is reachable among lanes included in a road being traveled by the host vehicle, based on map information stored in a memory, a planned travel route to the destination, and a current position of the host vehicle, and controls the host vehicle so that when the large-size vehicle is not traveling on the identified lane, the host vehicle moves to the identified lane, and when the large-size vehicle is traveling on the identified lane, controls the host vehicle so that the host vehicle moves to a lane that is not being traveled by the large-size vehicle among lanes where a lane change is necessary to reach the destination.

3. The vehicle controller according to claim 1, wherein in a case where other vehicles traveling behind the host vehicle are detected on each of lanes included in a road being traveled by the host vehicle and where one of the other vehicles is the large-size vehicle, the processor controls the host vehicle to move the host vehicle to a lane on which the number of vehicles between the large-size vehicle and the host vehicle after a lane change among the other vehicles is predicted to be the greatest of the lanes.

4. The vehicle controller according to claim 1, wherein the processor is further configured to estimate the distance between the host vehicle and a vehicle traveling behind the host vehicle on a host vehicle lane being traveled by the host vehicle among the detected other vehicles traveling behind the host vehicle, and wherein
   the processor further detects a lane-dividing line demarcating the host vehicle lane, and
   controls the position of the host vehicle so that when the estimated distance is not greater than a predetermined distance threshold, a lateral distance from the position of the host vehicle to the lane-dividing line in a direction traversing the host vehicle lane is less than when the estimated distance is greater than the predetermined distance threshold.

5. The vehicle controller according to claim 4, wherein the processor determines whether a road being traveled by the host vehicle has a road shoulder and has two lanes in a travel direction of the host vehicle, by referring to map information and the current position of the host vehicle; and when the road does not have a road shoulder but has two lanes in the travel direction of the host vehicle, the processor controls the position of the host vehicle so that the lateral distance to a lane-dividing line on the center side of the road among lane-dividing lines demarcating the host vehicle lane is less than the lateral distance to a lane-dividing line on an edge side of the road among the lane-dividing lines demarcating the host vehicle lane.

6. The vehicle controller according to claim 4, wherein when the lane being traveled by the host vehicle is adjacent to a merging lane, the processor controls the position of the host vehicle so that the lateral distance to a lane-dividing line on the side of the merging lane is less than the lateral distance to a lane-dividing line opposite the merging lane.

7. A method for vehicle control, comprising:
   detecting another vehicle traveling behind a host vehicle, based on a sensor signal obtained by a sensor for sensing surroundings of the host vehicle;
   determining whether the detected other vehicle satisfies an obstructing condition for obstructing view behind the host vehicle;
   controlling the host vehicle to secure the view behind the host vehicle when the obstructing condition is satisfied;
   determining whether traffic around the host vehicle will be congested in a predetermined period from a current time until a predetermined time ahead based on tracking other vehicles in a time series of images received from the sensor,
   detecting a large-size vehicle traveling behind the host vehicle, as the other vehicle, and a lane being traveled by the large-size vehicle, and
   when it is determined that traffic around the host vehicle will be congested in the predetermined period, moving the host vehicle to a lane that is not being traveled by the large-size vehicle.

8. A non-transitory recording medium that stores a computer program for vehicle control, the computer program causing a processor mounted on a host vehicle to execute a process comprising:
   detecting another vehicle traveling behind the host vehicle, based on a sensor signal obtained by a sensor for sensing surroundings of the host vehicle;
   determining whether the detected other vehicle satisfies an obstructing condition for obstructing view behind the host vehicle;
   controlling the host vehicle to secure the view behind the host vehicle when the obstructing condition is satisfied;
   determining whether traffic around the host vehicle will be congested in a predetermined period from a current time until a predetermined time ahead based on tracking other vehicles in a time series of images received from the sensor,
   detecting a large-size vehicle traveling behind the host vehicle, as the other vehicle, and a lane being traveled by the large-size vehicle, and when it is determined that traffic around the host vehicle will be congested in the predetermined period, moving the host vehicle to a lane that is not being traveled by the large-size vehicle.

* * * * *